Figure 1:
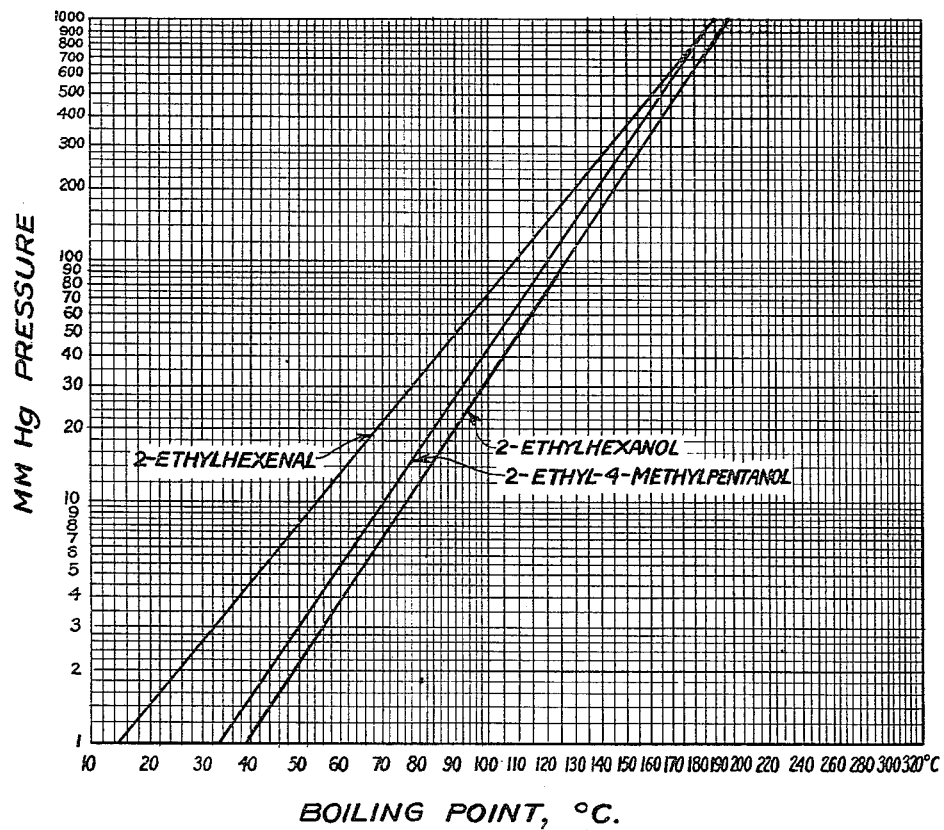

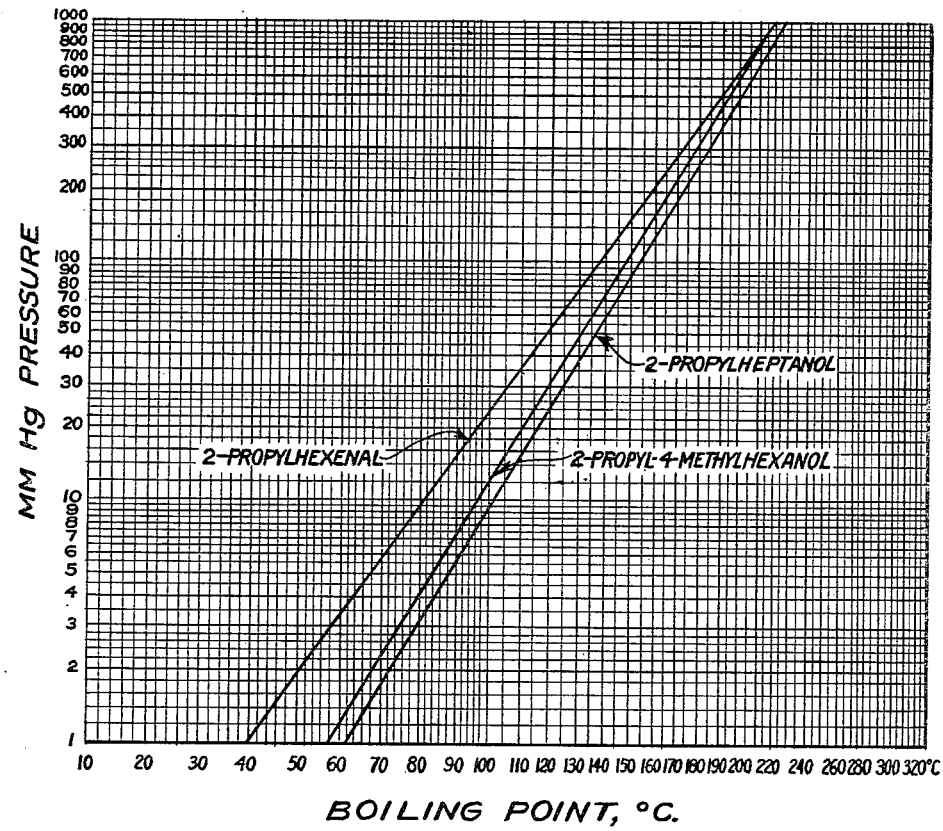

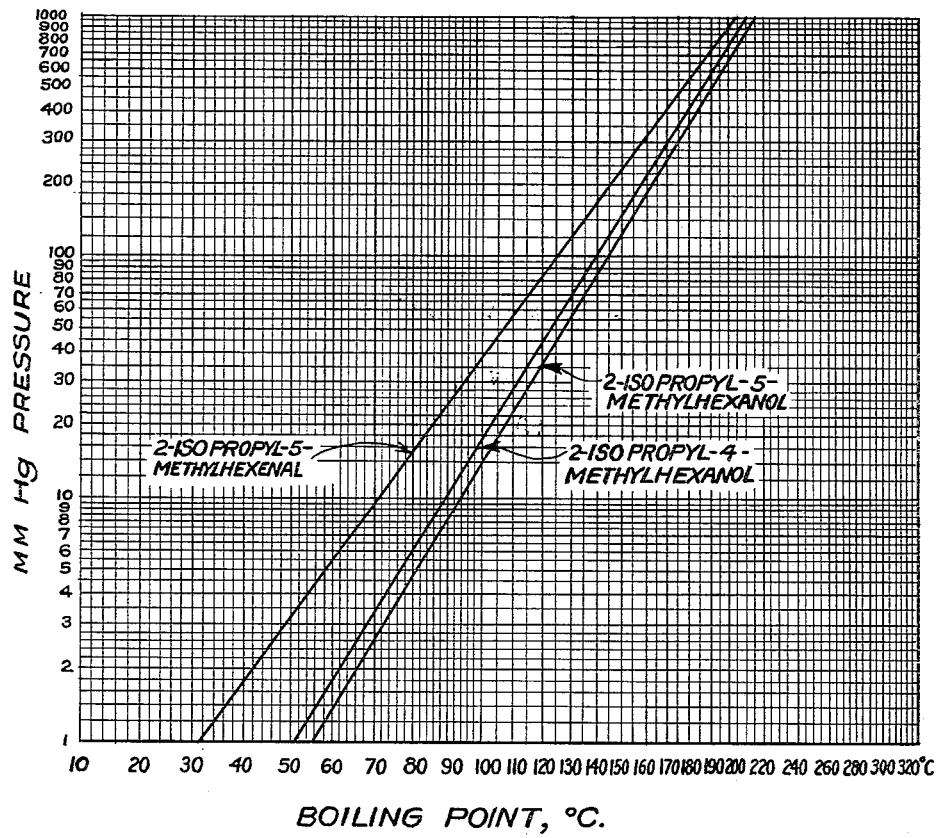

United States Patent Office 3,121,051
Patented Feb. 11, 1964

3,121,051
PROCESS OF PURIFYING AND COLOR-STABILIZING OCTANOLS AND DECANOLS PREPARED BY ALDOL CONDENSATION OF ALDEHYDES
Hugh J. Hagemeyer, Jr., Howard N. Wright, Jr., and Gonzalous A. Bobo, Jr., Longview, Tex., assignors to Eastman Kodak Company, Rochester, N.Y., a corporation of New Jersey
Continuation of application Ser. No. 729,480, Apr. 18, 1958. This application Jan. 10, 1961, Ser. No. 82,368
3 Claims. (Cl. 202—52)

This invention relates to a method of purifying octanols or decanols prepared by hydrogenation of the aldol condensation products of aliphatic aldehydes of four or five carbon atoms. The dicarboxylic acid esters of these octanols and decanols are useful as plasticizers, but for use in light-colored plastics it is necessary that the esters be free from color. A prerequisite for this is that the alcohol must be free from color and must remain free from color during the esterification process.

This application is a continuation of application Serial No. 729,480, filed April 18, 1958, and now abandoned.

Octanols and decanols can be produced from the principal products of the oxonation of propylene and butylenes, which are n-butyraldehyde and isobutyraldehyde from propylene, and n-valeraldehyde, 2-methylbutyraldehyde and 3-methylbutyraldehyde from butylenes. It is shown in U.S. patent application Serial No. 541,052, filed October 17, 1955, of Hagemeyer and Hudson, now U.S. Patent 2,852,563, that a mixture of isobutyraldehyde and n-butyraldehyde can be subjected to the aldol condensation, and that the unsaturated aldehydes (enals) resulting from the dehydration of the aldols formed can be hydrogenated to produce 2-ethyl-4-methyl-pentanol and 2-ethyl-hexanol. In the same way, 2-propyl-4-methyl-hexanol and 2-propyl-heptanol can be produced from the aldol condensation products of 2-methyl-butyraldehyde and n-valeraldehyde; and 2-isopropyl-4-methyl-hexanol and 2-isopropyl-5-methyl-hexanol can be produced from the aldol condensation products of 2-methyl-butyraldehyde and 3-methyl-butyraldehyde.

The chief difficulty in refining these primary alcohols lies in effecting the complete separation of the alcohols from the color-forming materials, namely the unsaturated aldehydes (enals) resulting from the dehydration of the aldols, and the saturated aldehydes (anals) which are intermediate products in the hydrogenation of the enals to the alcohols (anols). The boiling points of the various compounds at atmospheric pressure are listed in Table I.

In each case, the feed is a mixture of the two "reacting aldehydes." Thus, in case A, the feed is a mixture of isobutyraldehyde and n-butyraldehyde. The boiling points given in the columns headed "Enals" and "Anals" are those of the enals and anals corresponding respectively to the "end products" (anols) to which they stand opposite. Thus, in case A, in the first line, 164° C. is the boiling point of 2-ethyl-4-methyl-2-penten-1-al and 153° C. is the boiling point of 2-ethyl-4-methyl-pentan-1-al; in the second line, 175° C. is the boiling point of 2-ethyl-2-hexen-1-al and 164° C. is the boiling point of 2-ethyl-hexan-1-al.

It will be seen that at atmospheric pressure the higher boiling enal from each feed boils at approximately the same temperature as the lower boiling alcohol. However, by determining the boiling points of all of these compounds at 20 mm. pressure and constructing Cox charts (Cox charts are described in Perry, Chemical Engineers' Handbook, 3rd edition (1950), page 564) we have found that, although the spread between the boiling points of the two alcohols from each feed remains practically constant, the spread between the boiling point of the higher boiling enal and the lower boiling alcohol increases with decreasing pressure. Table II shows the boiling points at 20 mm. pressure of the compounds listed in Table I. Thus, we have found that distillation at reduced pressure affords a practical and convenient method for separating the enals and intermediate anals from the alcohols. We prefer to distil at pressures of from 10 to 50 mm. Hg, although pressures as high as 200 mm. may be used.

TABLE I

| Feed Mixture | Reacting Aldehydes | End Products | Boiling Points of Condensation Products at 760 mm. (in °C.) | | |
|---|---|---|---|---|---|
| | | | Enals | Anals | Anols |
| A | isobutyraldehyde | 2-ethyl-4-methylpentanol | 164 | 153 | 176.5 |
| | n-butyraldehyde | 2-ethylhexanol | 175 | 164 | 183.5 |
| B | 2-methylbutyraldehyde | 2-propyl-4-methylhexanol | 200 | 192 | 209 |
| | n-valeraldehyde | 2-propylheptanol | 209 | 200 | 218 |
| C | 2-methylbutyraldehyde | 2-isopropyl-4-methylhexanol | 192 | 183 | 202 |
| | 3-methylbutyraldehyde | 2-isopropyl-5-methylhexanol | 194 | 182 | 207 |

TABLE II

| Feed Mixture | Reacting Aldehydes | End Products | Boiling Points of Condensation Products at 20 mm. (in °C.) | | |
|---|---|---|---|---|---|
| | | | Enals | Anals | Anols |
| A | isobutyraldehyde | 2-ethyl-4-methylpentanol | 62 | 52 | 85 |
| | n-butyraldehyde | 2-ethylhexanol | 70 | 61 | 91 |
| B | 2-methylbutyraldehyde | 2-propyl-4-methylhexanol | 90 | 84 | 112 |
| | n-valeraldehyde | 2-propylheptanol | 97 | 89 | 117 |
| C | 2-methylbutyraldehyde | 2-isopropyl-4-methylhexanol | 77 | 68 | 104 |
| | 3-methylbutryraldehyde | 2-isopropyl-5-methylhexanol | 87 | 75 | 108 |

In the drawings attached to and forming a part hereof, FIGURE 1 shows the Cox chart of the boiling points of 2 - ethyl - 2 - hexen-1-al, 2-ethyl-4-methyl-pentanol and 2-ethyl-hexanol. FIGURE 2 shows the Cox chart of the boiling points of 2-propyl-2-hexen-1-al, 2-propyl-4-methyl-hexanol and 2-propyl-heptanol. FIGURE 3 shows the Cox chart of 2-isopropyl-5-methyl-2-hexen-1-al, 2-isopropyl-4-methyl-hexanol and 2-isopropyl-5-methyl-hexanol.

The process of manufacturing the crude alcohols is not the subject of this application; nevertheless it is briefly described as background in the examples given below, which are illustrative of the method of carrying out our invention.

Example 1

Isobutyraldehyde and n-butyraldehyde at a mole ratio of 4/1 were fed into an aldol reactor containing 70 volume percent of 2% sodium hydroxide, at a reaction temperature of 90–95° C. The reactor products were azeotroped away from the caustic and salts; then the unreacted isobutyraldehyde was stripped out and the remaining enals were hydrogenated in an autoclave at 150–200 p.s.i.g. with 5–10% Raney nickel as catalyst. The mixed alcohols formed were fed continuously into a drying and stripping column packed with Berl saddles and operated at a base temperature of 186° C. and a head temperature of 150–153° C., where water and by-product butanols were removed overhead.

Operating without the application of our invention, one portion of the material coming from the base of the drying and stripping column was fed into a 50-foot distilling column operating at atmospheric pressure, from which the anals and enals were removed overhead and recycled to the autoclave. Alcohols coming from the base of this distilling column were then fed into an alcohol finishing column packed with Berl saddles, from which 2-ethyl-4-methyl-pentanol was distilled overhead. Analysis of this material for impurities gave 1.29% unsaturated material as 2-ethyl-hexenal, 0.46% aldehyde as 2-ethyl-hexanal, and 0.024% water. The ASTM boiling range was 175.2–178.5° C. The original APHA color was 10 p.p.m. Color stability under esterification conditions was indicated by dioctyl phthalate (DOP) color test and sulfuric acid reflux color test. Both gave APHA colors greater than 500 p.p.m.

The initials ASTM stand for American Society for Testing Materials. The initials APHA stand for American Public Health Association. The measurement of APHA color, on a Pt–Co scale, is described on page 673 of the book "Technical Methods of Analysis," by Roger C. Griffin, published in 1927 by McGraw-Hill. The sulfuric acid reflux color test and the DOP color test are described following the second portion of this example.

Operating according to our invention, another portion of the material coming from the base of the drying and stripping column was fed into the same 50-foot distilling column, operating at 33–35 mm. pressure, from which the anals and enals were removed overhead and recycled to the autoclave. Alcohols from the base of this distilling column were then fed into the alcohol finishing column packed with Berl saddles, from which 2-ethyl-4-methyl-pentanol was distilled overhead. Analysis of this material for impurities gave 0.21% unsaturated material as 2-ethyl-hexenal, 0.19% aldehyde as 2-ethyl-hexanal, and 0.10% water. The ASTM boiling range was 175.8–178.6° C. The original APHA color was less than 5 p.p.m. Sulfuric acid reflux color was 20 p.p.m. APHA, and DOP color was 15 p.p.m. APHA.

*Sulfuric acid reflux color test.*—Place 100 ml. of the sample in a 300-ml. round bottom flask with standard taper, ground glass joint. While vigorously swirling the sample, slowly pipette 2 ml. of concentrated sulfuric acid into the flask and add 2 or 3 Carborundum chips. Attach a water cooled reflux condenser of at least 200 mm. length, immediately affix an electric heating mantle to the flask, and bring the contents to a boil. Reflux for 50 minutes, measuring time from the instant the first drop falls from the condenser. Remove the flask and cool as rapidly as possible to about 70° C. by swirling first under warm tap water and then under cold tap water. Immediately fill a Nessler tube to the mark with the resulting test mixture and compare the color with the standard tubes of the platinum-cobalt scale, as described in the Griffin reference, to the nearest 5 p.p.m. The sulfuric acid is reagent grade.

*DOP color test.*—Weigh 148 g. of phthalic anhydride into a 1000 ml. round bottom flask equipped with a ground glass joint. Add 364 g. of the sample to the flask containing the phthalic anhydride. While swirling the flask, add 0.1 ml. of concentrated $H_2SO_4$ from a 1 ml. pipette graduated in 0.01 ml. Add 2 or 3 Carborundum chips to the flask. Attach a Dean-Stark moisture receiver, equipped with a stopcock for draining water, to the flask. Fill the receiver with additional sample until a drop overflows into the flask. Attach a reflux condenser at least 200 mm. in length to the Dean-Stark receiver. Affix a hemispherical heating mantle to the flask and heat rapidly, with intermittent shaking and swirling, until the phthalic anhydride melts. Reflux the mixture for exactly 30 minutes, measuring time from the instant the first drop falls from the condenser tip. Do not allow more than 5 ml. of water to accumulate in the Dean-Stark trap. Remove the flask and cool as rapidly as possible to 70° C. by swirling it first under warm tap water and then under cool tap water. Immediately fill a Nessler tube to the mark with the resulting test mixture and compare the color with the standard tubes of the platinum-cobalt scale, as described in the Griffin reference, to the nearest 5 p.p.m. The phthalic anhydride and sulfuric acid are reagent grade.

Example 2

A mixture of n-valeraldehyde and 2-methyl-butyraldehyde was subjected to aldol condensation and dehydration by the method used in Example 1, to produce 2-propyl-2-hepten-1-al and 2-propyl-4-methyl-2-hexen-1-al. These decenals were hydrogenated by the method described in Example 1, and the product was fed into a drying and stirring column packed with Berl saddles, where water and by-product amyl alcohols were removed overhead.

Operating without the application of our invention, a portion of the material coming from the base of the drying and stripping column was fed into a 50-foot distilling column operating at atmospheric pressure, from which the anals and enals were removed overhead and recycled to the autoclave. Alcohols coming from the base of this distilling column were then fed into an alcohol finishing column packed with Berl saddles, from which mixed primary decanols were distilled overhead. Analysis of this material for impurities gave 0.15% unsaturated material as decenal, and 0.27% aldehyde as decanal. The ASTM boiling range was 214.0–218.0° C. The original APHA color was less than 5 p.p.m. Both acid reflux color and DOP color were over 500 p.p.m. APHA.

Operating according to our invention, another portion of the material coming from the base of the drying and stripping column was fed into the same 50-foot distilling column, operating at 50 mm. pressure, from which the anals and enals were removed overhead and recycled to the autoclave. Alcohols from the base of this distilling column were then fed into the alcohol finishing column packed with Berl saddles, from which mixed primary decanols were removed overhead. Analysis of this material gave 0.05% unsaturated material as decenal, and 0.11% aldehyde was decanal. The ASTM boiling range was 214.1–219.2° C. Original APHA color was less than 5 p.p.m., acid reflux color was 35 p.p.m. APHA, and DOP color was 45 p.p.m. APHA.

While the decrease effected by our invention in the percentages of anals and enals present in the finished alcohols is small, it has a very considerable effect on the color stability of the alcohols, and is therefore critical for the utility of the alcohols for the manufacture of plasticizers.

We claim:

1. A method of preparing primary octanols of sufficient color stability for use in forming color-free plasticizer esters which comprises subjecting to distillation at a pressure of 10 to 50 mm. Hg a crude octanol product obtained by dehydrating and dehydrogenating the aldol condensation product of isobutyraldehyde and n-butyraldehyde, which octanol product comprises 2-ethyl-4-methyl-pentanol and 2-ethylhexanol and small amounts of color-forming unsaturated aldehydes resulting from dehydration of the aldol condensation product, the distillation pressure being sufficiently low that the boiling point of the higher boiling of said unsaturated aldehydes is at least about 15° C. lower than the boiling point of said 2-ethyl-4-methylpentanol, recovering from said distillation an overhead fraction comprising said unsaturated higher boiling aldehyde and a bottoms fraction comprising the primary octanols, and subjecting said bottoms fraction to a subsequent distillation to recover overhead an octanol fraction having a sufficiently low concentration of color-forming aldehydes to be suitable for preparation of color-free esters and having a sulfuric acid reflux color no greater than about 100 p.p.m. APHA.

2. A method for preparing primary decanols of sufficient color stability for use in forming color-free plasticizer esters which comprises subjecting to distillation at a pressure of 10 to 50 mm. Hg a crude decanol product obtained by dehydrating and hydrogenating the aldol condensation product of 2-methylbutyraldehyde and n-valeraldehyde, which decanol product comprises 2-propyl-4-methylhexanol and 2-propylheptanol and small amounts of color-forming unsaturated aldehydes resulting from dehydration of the aldol condensation product, the distillation pressure being sufficiently low that the boiling point of the higher boiling of said unsaturated aldehydes is at least about 15° C. lower than the boiling point of said 2-propyl-4-methylhexanol, recovering from said distillation an overhead fraction comprising said unsaturated higher boiling aldehyde and a bottoms fraction comprising the primary decanols, and subjecting said bottoms fraction to a subsequent distillation to recover overhead a decanol fraction having a sufficiently low concentration of color-forming aldehydes to be suitable for preparation of color-free esters and having a sulfuric acid reflux color no greater than about 100 p.p.m. APHA.

3. A method of preparing primary decanols of sufficient color stability for use in forming color-free plasticizer esters which comprises subjecting to distillation at a pressure of 10 to 50 mm. Hg a crude decanol product obtained by dehydrating and hydrogenating the aldol condensation product of 2-methylbutyraldehyde and 3-methylbutyraldehyde, which decanol product comprises 2-isopropyl-4-methylhexanol and 2-isopropyl-5-methylhexanol and small amounts of color-forming unsaturated aldehydes resulting from dehydration of the aldol condensation product, the distillation pressure being sufficiently low that the boiling point of the higher boiling of said unsaturated aldehydes is at least about 15° C. lower than the boiling point of said 2-isopropyl-4-methylhexanol, recovering from said distillation an overhead fraction comprising said unsaturated higher boiling aldehyde and a bottoms fraction comprising the primary decanols, and subjecting said bottoms fraction to a subsequent distillation to recover overhead a decanol fraction having a sufficiently low concentration of color-forming aldehydes to be suitable for preparation of color-free esters and having a sulfuric acid reflux color no greater than about 100 p.p.m. APHA.

References Cited in the file of this patent

FOREIGN PATENTS 672,635   Great Britain _____ May 21, 1952

OTHER REFERENCES

"Azeotropic Data," Horsley, published by American Chemical Society, 1952, page 319.

UNITED STATES PATENT OFFICE
CERTIFICATE OF CORRECTION

Patent No. 3,121,051                                February 11, 1964

Hugh J. Hagemeyer, Jr., et al.

It is hereby certified that error appears in the above numbered patent requiring correction and that the said Letters Patent should read as corrected below.

Column 4, line 72, for "dehydrogenating" read -- hydrogenating --.

Signed and sealed this 13th day of October 1964.

(SEAL)
Attest:

ERNEST W. SWIDER
Attesting Officer

EDWARD J. BRENNER
Commissioner of Patents